(12) United States Patent
Wang et al.

(10) Patent No.: US 12,282,668 B2
(45) Date of Patent: Apr. 22, 2025

(54) METHODS, APPARATUSES, NON-TRANSITORY COMPUTER-READABLE STORAGE DEVICES, AND SYSTEMS USING FINE-GRAINED WHOLE-PROGRAM POINTER LAYOUT TRANSFORMS

(71) Applicants: Huawei Technologies Canada Co., Ltd., Kanata (CA); The Governing Council of the University of Toronto, Toronto (CA)

(72) Inventors: Yifei Wang, Beijing (CN); David Juen Fung Lie, Toronto (CA); Shengjie Xu, Toronto (CA)

(73) Assignees: Huawei Technologies Canada Co., Ltd., Kanata (CA); The Governing Council of the University of Toronto, Toronto (CA)

( * ) Notice: Subject to any disclaimer, the term of this patent is extended or adjusted under 35 U.S.C. 154(b) by 147 days.

(21) Appl. No.: 18/096,845

(22) Filed: Jan. 13, 2023

(65) Prior Publication Data
US 2024/0241651 A1 Jul. 18, 2024

(51) Int. Cl.
*G06F 15/173* (2006.01)
*G06F 3/06* (2006.01)
(Continued)

(52) U.S. Cl.
CPC .......... *G06F 3/0623* (2013.01); *G06F 3/0643* (2013.01); *G06F 3/0673* (2013.01); *G06F 8/41* (2013.01); *G06F 8/443* (2013.01)

(58) Field of Classification Search
CPC .... G06F 3/0623; G06F 3/0643; G06F 3/0673; G06F 8/41; G06F 8/443
See application file for complete search history.

(56) References Cited

U.S. PATENT DOCUMENTS 6,012,128 A * 1/2000 Birns .................... G06F 9/3861
711/2
2002/0184486 A1* 12/2002 Kershenbaum ......... G06F 9/468
713/150
(Continued)

OTHER PUBLICATIONS

NPL by Watson et al. , Capability Hardware Enhanced RISC Instructions: CHERI Instruction-Set Architecture (Version 7), 2022, p. 1-2. (Year: 2022).*

*Primary Examiner* — S. Sough
*Assistant Examiner* — Mohammad H Kabir
(74) *Attorney, Agent, or Firm* — Troutman Pepper Locke LLP; Tim Tingkang Xia, Esq.

(57) ABSTRACT

Methods and devices for analyzing and updating intermediate representations containing pointers includes compiling one or more source files into intermediate representations (IRs) having pointers, analyzing the IRs, producing transformed IRs comprising updated pointers, and producing object code from the transformed IRs. The device may include one or more non-transitory computer-readable storage devices having computer-executable instructions, when executed, cause a processing structure to perform the actions described relating to pointers. The analysis and updating of pointers may relate to types of bounds to enhance security of the systems in question by preventing erroneous references to memory space by pointers.

18 Claims, 6 Drawing Sheets

(51) Int. Cl.
   *G06F 8/41*    (2018.01)
   *G06F 9/44*    (2018.01)
   *G06F 15/16*   (2006.01)

(56) References Cited

U.S. PATENT DOCUMENTS

| | | | | |
|---|---|---|---|---|
| 2004/0088666 | A1* | 5/2004 | Poznanovic | G06F 30/30 |
| | | | | 716/105 |
| 2012/0151461 | A1* | 6/2012 | Odaira | G06F 8/434 |
| | | | | 717/156 |
| 2015/0362575 | A1* | 12/2015 | Ourselin | G06T 5/70 |
| | | | | 382/131 |
| 2016/0004519 | A1* | 1/2016 | Carbon | G06F 9/45504 |
| | | | | 717/153 |
| 2018/0081650 | A1* | 3/2018 | Larin | G06F 8/54 |
| 2018/0275976 | A1* | 9/2018 | Edler Von Koch | G06F 8/443 |
| 2022/0012055 | A1* | 1/2022 | Lemay | G06F 9/3004 |
| 2022/0382885 | A1* | 12/2022 | Durham | G06F 12/0646 |
| 2023/0305718 | A1* | 9/2023 | Takemoto | G06F 3/0608 |
| 2023/0418934 | A1* | 12/2023 | Constable | G06F 21/51 |
| 2024/0086579 | A1* | 3/2024 | Ayrapetyan | G06F 21/52 |

\* cited by examiner

```
1  struct T {
2      int   dummy;
3      int*  ptr;
4  } obj1, obj2;
5  void foo(int* arg);
6  ...
7  obj1.ptr = &obj1.dummy;
8  obj2.ptr = &obj2.dummy;
9  struct T* obj = (condition)?
10                 &obj1: &obj2;
11 ...
12 foo(obj->ptr);
```

METHODS, APPARATUSES, NON-TRANSITORY COMPUTER-READABLE STORAGE DEVICES, AND SYSTEMS USING FINE-GRAINED WHOLE-PROGRAM POINTER LAYOUT TRANSFORMS

TECHNICAL FIELD

The present disclosure pertains generally to methods, apparatuses, non-transitory computer-readable storage devices, and systems relating to pointers and in particular to methods, apparatuses, non-transitory computer-readable storage devices, and systems for analyzing and updating intermediate representations containing pointers.

BACKGROUND

Programs written in some programming languages such as C or C++ may be susceptible to being compromised by a class of vulnerabilities generally referred to as memory corruption. An example of memory corruption is spatial attack where an attacker may maliciously create input that triggers a bad pointer arithmetic that may push a program pointer out of its intended memory range. The attacker may then later use the pointer to leak or corrupt memory at an unintended memory location. An approach to defend against memory corruption caused by spatial memory errors is to maintain pointer bounds that track the intended memory range such that access by a pointer outside this range be detected.

A method to maintain pointer bounds is to store pointer bounds inline with a pointer, which effectively expands the size of the pointer to include the pointer bounds. These expanded pointers maybe be referred to as inline fat pointers. For basic inline fat pointers, the bounds are commonly twice the size of the address and therefore the size of inline fat pointers may be three to four times the size of the raw pointer itself. Several methods such as bounds compression have been used to reduce the overhead of inline fat pointers. For example, bounds compression is used on a reduced instruction set computer (RISC) in the inline fat pointer architecture called Capability Hardware Enhanced RISC Instructions (CHERI), which results in reducing the size of inline fat pointers to about twice the size of raw pointers. However, bounds compression may result in losses in certain circumstances as compressed bounds need to be approximated or extended to accommodate memory ranges that are not optimally aligned or maybe too large, which may result in out-of-bounds accesses evading detection.

SUMMARY

In some examples of the present disclosure, methods and devices use whole-program analysis of intermediate representations to update pointer information.

According to one aspect of this disclosure, there is provided a method comprising: compiling one or more source files into intermediate representations (IRs) having pointers; analyzing the IRs: producing transformed IRs comprising updated pointers: and producing object code from the transformed IRs.

In an embodiment, the pointers have uncompressed bounds.

In an embodiment, said analyzing the IRs comprises: analyzing the IRs of all of the one or more source files.

In an embodiment, the method further comprises: compiling a point-to graph for each of the pointers.

In an embodiment, the point-to graph comprises: allocation nodes, object-partition nodes, and pointer-expression nodes.

In an embodiment, said compiling the point-to graph comprises: compiling dataflow information of the pointers.

In an embodiment, said analyzing the IRs comprises: performing static analysis of the IRs for obtaining instrumentation parameters.

In an embodiment, the static analysis comprises: identifying a subset of the pointers requiring extension and determining a required bound type for each pointer.

In an embodiment, said producing the transformed IRs comprises: changing bounds types of one or more of the pointers.

In an embodiment, the method is compatible with Capability Hardware Enhanced RISC Instructions (CHERI) pointer architecture.

According to another aspect of this disclosure, there is provided one or more processors for executing instructions to perform the above-described method.

According to another aspect of this disclosure, there is provided one or more non-transitory computer-readable storage devices comprising computer-executable instructions, wherein the instructions, when executed, cause a processing structure to perform actions comprising: compiling one or more source files into IRs having pointers; analyzing the IRs; producing transformed IRs comprising updated pointers: and producing object code from the transformed IRs.

In an embodiment, the pointers have uncompressed bounds.

In an embodiment, said analyzing the IRs comprises: analyzing the IRs of all of the one or more source files.

In an embodiment, the instructions, when executed, cause the processing structure to perform further action of compiling a point-to graph for each of the pointers.

In an embodiment, the point-to graph comprises allocation nodes, object-partition nodes, and pointer-expression nodes.

In an embodiment, said analyzing the IRs comprises: performing static analysis of the IRs for obtaining instrumentation parameters.

In an embodiment, the static analysis comprises: identifying a subset of the pointers requiring extension.

In an embodiment, identifying a subset of the pointers requiring extension comprises: determining a required bound type for each pointer.

In an embodiment, said producing the transformed IRs comprises: changing bound types of one or more of the pointers.

In an embodiment, the processing structure is compatible with CHERI pointer architecture.

BRIEF DESCRIPTION OF THE DRAWINGS

For a more complete understanding of the disclosure, reference is made to the following description and accompanying drawings, in which.

Throughout the appended drawings, like features are identified by like reference numerals.

DETAILED DESCRIPTION

Unless otherwise defined, all technical and scientific terms used herein generally have the same meaning as commonly understood by one of ordinary skill in the art to which this disclosure pertains. Exemplary terms are defined below for ease in understanding the subject matter of the present disclosure.

The Capability Hardware Enhanced, Reduced Instruction Set Computer (RISC) Instructions (CHERI) architecture is an inline fat pointer architecture with hardware support used for pointer-bounds retrieval and checking. In CHERI, hardware may provide instructions to load and store fat pointers as well as performing bounds checking where inline fat pointers are used for memory access. Aside from pointer bounds, CHERI may embed additional metadata relating to each pointer for additional security policies and the resulting fat pointer may be referred to as capability.

Figure 1A:
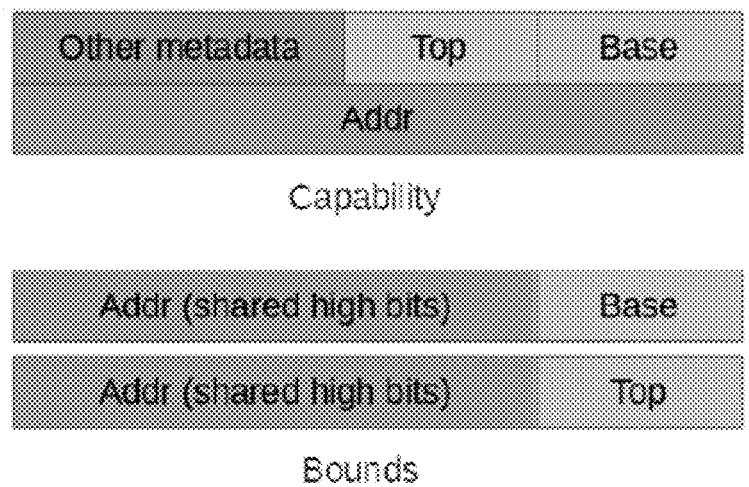
FIGS. 1A and 1B are diagrams illustrating bits addressed in a Capability Hardware Enhanced RISC Instructions (CHERI) compression architecture.
Figure 1B:
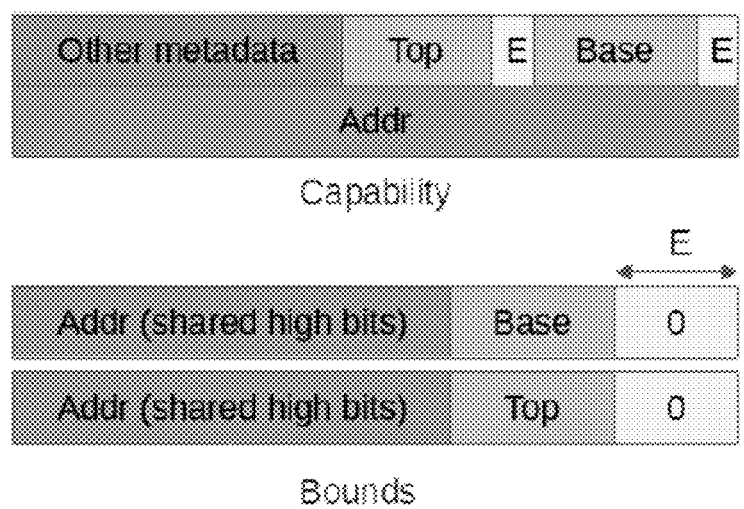

Earlier versions of CHERI use uncompressed bounds and each capability may be four times the size of a raw pointer. Later versions of CHERI use compressed bounds encoding, resulting in the size of the capability being two times the size of the raw pointer. The compression used in CHERI is based on the characteristic that most of the higher address bits of the lower bound, address, and the upper bound are the same as shown in FIG. 1A. As a result for compression, only the lower bits of the lower and upper bounds need to be stored when the full address is available in the pointer. However, as shown in FIG. 1B, when the number of distinct lower bits increases, not all of the distinct bits of the lower and upper bounds may be stored in the fixed size. This may occur, for example, when the allocated object is a certain size. When not all the distinct bits of the lower and upper bounds may be stored, the lower bits of both the upper and lower bounds maybe discarded with the permitted ranges of the pointer rounded to power-of-two boundaries. For example, an object having an memory size allocation of 4097 bytes may have an upper bounds approximated to 4104 bytes from the base address, leaving seven (7) bytes after the object potentially accessible.

Program analysis methods often require an understanding of what objects a pointer may point to. Point-to analysis may be used to assist in this process and commonly produces a graph representation of the relationships between pointers and objects to be used when responding to queries for other analyses. Productions of a graph representation may be done by collecting information relating to instances of pointer manipulation and memory access instructions, as well as function calls to analyze the dataflow of pointers, generating constraints that the resulting point-to graph may follow, and solving constraints to get a fixed-point solution.

As there are generally many more pointers than objects, it is common that pointers point to the same set of objects. Point-to analysis typically performs special handling for these scenarios to reduce the run time of analysis. When more than one object is pointed to by one pointer, partitioning may be used herein such that all possible objects pointed to by one pointer are merged into a single partition and the partition is treated as a single object.

As CHERI's compressed-bounds encoding may result in losses, pointer bounds may be approximated when the permitted ranges are large but bounds may be insufficiently aligned. Out-of-bounds accesses may occur that evade detection and result in the corruption of memory. Notably, the use of compressed bounds is an all-or-nothing application as there is no way to selectively use uncompressed bounds in basic CHERI implementations. Existing point-to graph resulting from point-to analysis is commonly used for analyzing in-memory objects and generally lack information required for supporting instrumentations. For example, a point-to graph for cell-based analysis generally does not include or express data of function arguments and return values as cells and therefore their instrumentation may require additional information and processing.

An approach to address security vulnerabilities in the protection of inline fat pointers with compressed bounds is to selectively switch back to uncompressed bounds for fat pointers that are vulnerable to bounds approximation. For this approach, the set of vulnerable fat points needs to be identified so that data layout transformations may be applied to update these fat pointers with accurate uncompressed bounds.

In some embodiments disclosed herein, a method analyzes an entire program using a whole-program analysis at a compiler intermediate representation (IR) level followed by instrumentation for protecting the program for ensuring safety thereof. The method may be integrated as a link-time optimization pass in a compiler and assumes that the platform (for example, hardware, emulator, and/or the like) supports uncompressed bounds. Platforms not already supporting uncompressed bounds may be extended to provide support.

The method uses whole-program analysis at the compiler IR level to provide an extended point-to graph specific to the analysis. Point-to graphs generally comprise features directed to data layout transformation, including tracking points-to relationships between pointers and objects, as well as partitioning objects based on the points-to relationships and other metrics, such as allocation sites and types. The method provides support for dataflow analysis and program instrumentation for this purpose. The method treats function declarations as structure (struct) allocations and function parameters, and return values as struct members to support type changes of function prototypes. The method may preserve more edge types for enabling dataflow analysis on extended point-to graph nodes. The use of extended point-to graphs improves the accuracy of whole-program analysis and may reduce unnecessary transforms on instrumented programs, therefore reducing performance overhead incurred.

The method also uses static analysis techniques to determine information required for instrumentation. This may include determining which pointers may result in spatial memory errors, whether bounds are currently accurate enough if pointers are using compressed bounds, and how other pointers in the program should be transformed such that any unsafe pointers that require accurate bounds have those bounds available.

The method may also transform the program according to the results of the analysis. The transformation may include transforming involved function declarations and data types to make any required space for uncompressed bounds, and providing instrumentation instructions for maintaining uncompressed bounds for unsafe pointers and for checking them against uncompressed bounds as necessary.

Some embodiments of methods and devices disclosed herein may be used on any computer system comprising support for inline fat pointer with compressed bounds, which may include workstations and servers, as well as embedded systems. The method is not dependent on how support for fat pointers is implemented, and may include hardware, software, or a combination thereof. An example is the CHERI architecture where hardware comprises capability register and dedicated instructions for inline fat pointers. The method may also be implemented in the compiler in these architectures. In certain instances, methods and devices may require modification to support uncompressed bounds in addition to compressed bounds.

Figure 2:
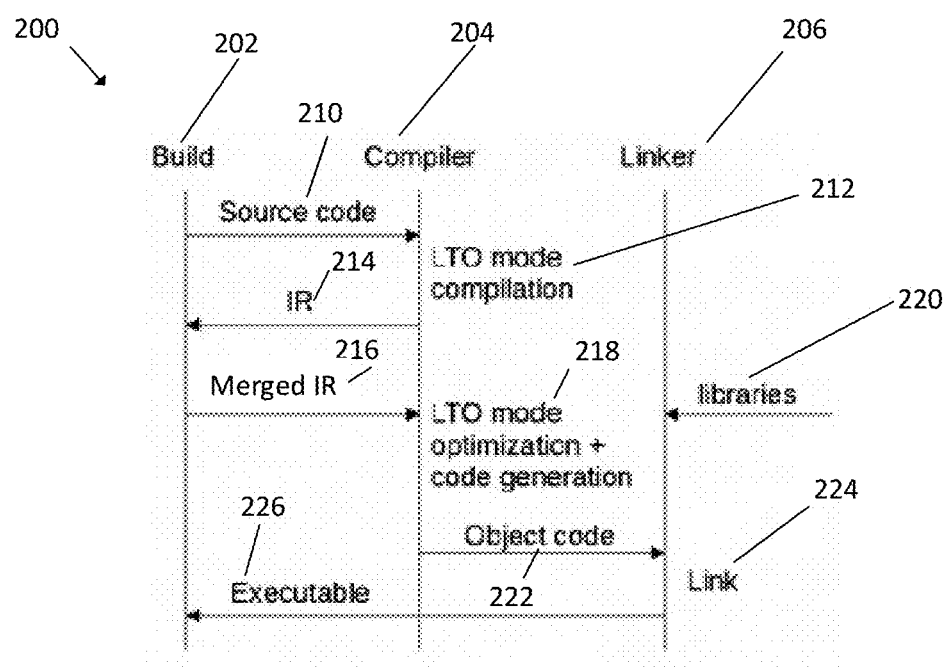
FIG. 2 is a diagram illustrating a workflow to create an executable file from source code in accordance with representative embodiments of the present disclosure.

FIG. 2 shows the workflow of an embodiment of the present disclosure wherein the method 200 is used as a link-time optimization (LTO) pass in a compiler 204 that performs the whole-program analysis and transformation. In addition to the compiler 204, the method 200 comprises a build module 202 and a linker 206. During the build process, the build module 202 provides source code 210 to the compiler 204, which performs LTO mode compilation 212 on each file of source code 210 into a compiler-specific IR 214 and sends it to the build module 202. Once all files of source code 210 are compiled to IRs 214, the build module 202 merges the IRs 214 into a merged IR 216. The compiler 204 initiates LTO mode linking and code generation 218, which optimizes the merged IR 216, performs code generation to produce object code 222, and passes all object code 222 and libraries 220 to the linker 206 to link 224 the object code 222 to create an executable file 226. Program analysis and transformation may be executed during LTO mode optimization.

In an exemplary embodiment of the present disclosure, the method 200 is performed for a modified CHERI processor on a 64-bit RISC-V (RISC-V is an instruction set based on RISC principles and is an open-standard instruction set). CHERI may have hardware support for compressed pointer bounds capabilities, and appropriate modification may be made to hardware and the compiler to support uncompressed pointer bounds. While some compilers may only produce IRs that only use compressed pointer bounds capabilities, the compiler is modified in the exemplary embodiment to support uncompressed pointer bounds for pointers identified as potentially vulnerable.

Figures 3A, 3B:
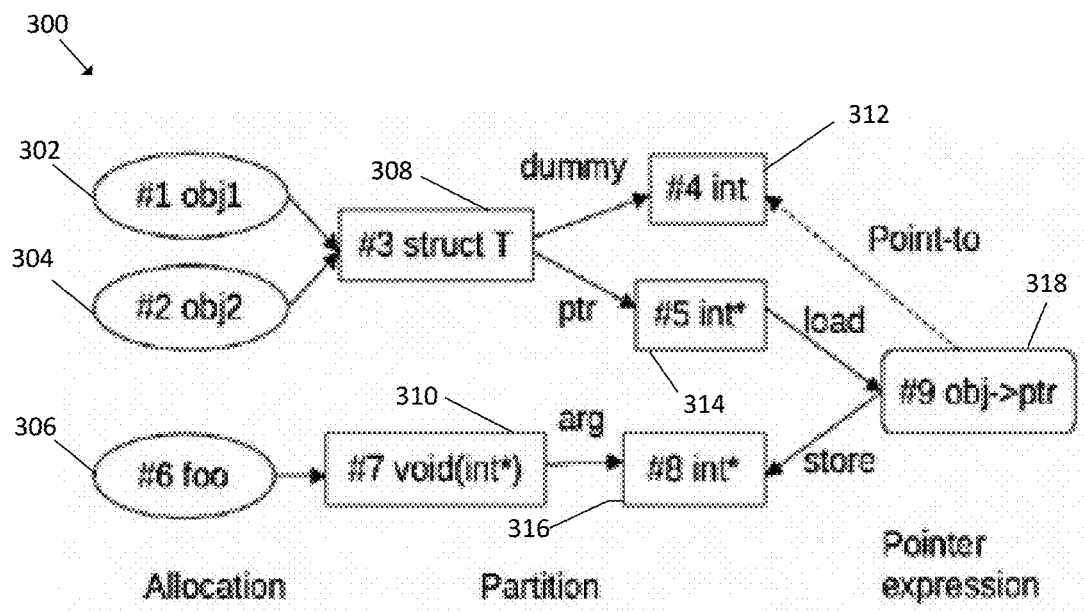
FIG. 3A is sample code relating to the creation of objects, functions, and pointers in accordance with representative embodiments of the present disclosure.
FIG. 3B is a diagram illustrating an extended point-to graph relating to the sample code of FIG. 3A.

During the optimization pass, an extended point-to graph 300 is initially generated. FIG. 3A is sample code relating to the creation of objects, functions, pointers, which FIG. 3B illustrates a point-to graph 300 in relation thereto. The point-to graph 300 comprises three types of nodes: allocation, object partition, and pointer expression.

Object allocations and function declarations have corresponding allocation nodes. Each allocation node is a record of the underlying entity (for example, object allocations or function declarations) for instrumentation use. Node #1 302 and node #2 304 are created for object allocation of objects obj1 and obj2, respectively. Node #6 306 is created for the declaration of the function foo( ).

Multiple objects or field may commonly have identical properties as far as the analysis of the method is concerned due to pointers, and are considered to be in a single partition. Each partition node may represent such objects or fields in the partition. Each allocation may have an edge (which is defined as a link joining two unordered nodes or partitions in a graph) to the partition that an object belongs to. Node #3 308 is the partition for obj1 and obj2, and node #7 310 is the partition for the function foo( ). The method treats object fields (for example, struct members dummy and pointer (ptr) in relation to struct T) as standalone entities from their parent types. Therefore, node #4 312 and node #5 314 are created as two struct members for struct T. Further, node #4 308 comprises contained edges to node #4 312 and node #5 314 with a description relating to which member the destination node corresponds to. Function arguments (arg) and return values are treated independently from function type and, as a result, the argument arg of the function foo( ) has its own node #8 316.

Each pointer expression in a program may have their own node in the point-to graph with the node recording the code location of the expression for subsequent instrumentation. While FIG. 3B only illustrates pointer node #9 318 for obj→ptr for simplifying the point-to graph, expressions like obj and obj1→dummy may also have pointer expression nodes as well. Each pointer expression node may have the following types of edges to partition nodes: point-to edge, load edge, and store edge. A point-to edge from pointer expression node to partition node represents that a pointer expression may point to any objects in the partition. A load edge from pointer expression node to partition node represents that a pointer expression may be loaded from the set of pointers represented by the partition (for example, a pointer member in a struct or a pointer argument of a function). A store edge from pointer expression partition node represents that a pointer expression may write a value to one of the pointers of the partition.

The point-to graph may be generated from known point-to analysis results. In an exemplary embodiment of the present disclosure, the method initially runs an inter-procedural field-sensitive point-to analysis to determine dataflow information of pointer expressions within a program. The method traverses through the point-to graph from each object allocation and function declaration to building an extended point-to graph. While some embodiments of the present disclosure are primarily directed to utilizing uncompressed pointer bounds for inline fat pointers with compressed bounds, the extended point-to graph is not limited to this use case as it may be applied for other whole-program data layout transforms that modify pointers, not being limited to the purpose of spatial memory safety.

Once an extended point-to graph is generated, the method performs analysis and instrumentation. In the analysis stage, the method identifies all pointers (that is, partition nodes and pointer expression nodes) that may be extended to provide space for uncompressed bounds. In an exemplary embodiment of the present disclosure, the method determines which pointers may result in bad arithmetic and spatial memory errors, determines required bounds types for each pointer, and determines all changes for pointer types.

In an embodiment disclosed herein, determining which pointers may result in bad arithmetic and spatial memory errors may require two steps. A forward dataflow analysis is conducted to determine statistically-safe access ranges for each pointer.

Required bounds types for each pointer is determined, wherein if all possible ranges are small enough, then the compressed bounds are enough. First, all possible point-to objects for a pointer are identified. Then, the method determines whether the compressed bounds are adequate for each possible bounds from the point-to object. The criteria for this determination may depend on the applicable inline fat pointer scheme. For example, in an exemplary embodiment, CHERI is used on a 64-bit RISC-V. In this example, if the length of bounds is greater than 4 kilobytes and the bounds are not substantially or sufficiently aligned, the uncompressed bounds may be adequate for that pointer, where the alignment threshold may depend on the length of bounds.

To determine all changes for pointer types, constraint solving may be used to ensure uncompressed bounds are capable of reaching a pointer from a pointer source. By using point-to graph nodes instead of source program constructs (for example, a pointer member declaration within a struct), as a supporting entity for variables with constraints, a solution to constraints ensures that types of objects that may be pointed to by a pointer are consistent.

For the analysis stage, a point-to graph may improve the quality of static analysis. For example, if a source program comprises a variable that indicates bounds for a pointer, the point-to graph may permit the statistically safe range to be represented in terms of the variable so that fewer pointers are considered unsafe so as to require accurate bounds. Referring to the embodiment illustrated in FIG. 3B, if the ptr member in struct T points to an array and the dummy member always comprises the array size, then the bounds for ptr may be determined from dummy. Further, when foo( ) is modified to a pointer with uncompressed bounds as an input, the uncompressed bounds may be determined from dummy and no changes are required to struct T.

Figure 4:
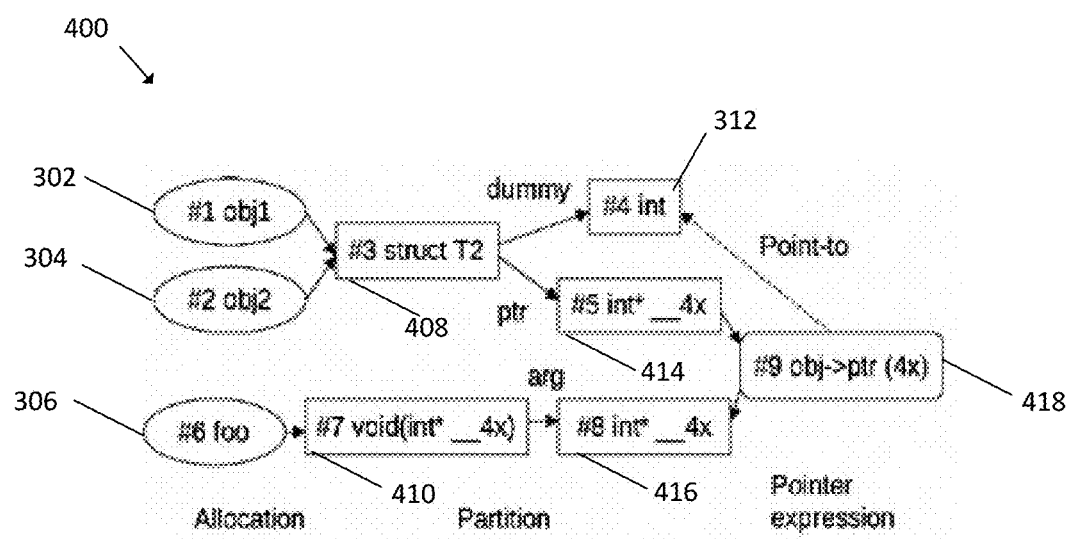
FIG. 4 is a diagram illustrating an extended point-to graph relating to pointers having uncompressed bounds.

The instrumentation stage may be highly dependent on the compiler used the associated compiler architecture. However, the method may generally change pointer types according to the analysis results and provide instrumentation instructions to create, copy, and use uncompressed bounds for associated pointers. The point-to graph may assist in determining new types of objects and functions that may require type changes. FIG. 4 illustrates a point-to graph 400 similar to the point-to graph 300 in FIG. 3B but for pointers with uncompressed bounds. Node #4 312 is also unchanged from point-to graph 300. Node #5 414, node #8 416, and node #9 418 are expanded to include uncompressed bounds, which is represented by the "4×" notation. The method then identifies affected partitions at node #3 408 and node #7 310 by traversing a containment edge. A new struct body, struct T2, replaces struct T of point-to graph 300 which results in the creation of node #1 302 and node #2 304 that are created for object allocation of obj1 and obj2 after checking all members of the point-to graph 400 along the edges of node #3 408. Node #6 306 is also created for the declaration of the function foo( ) relating to the partition at node #7 410.

Aside from compiler instrumentation, it may also be necessary for the applicable system platform to support uncompressed bounds. For the exemplary embodiment for CHERI on a 64-bit RISC-V architecture, encoding for uncompressed bounds in memory and in capability registers is supported, and instructions may be introduced to create uncompressed bounds and to check the pointer with the bounds.

Figure 5:
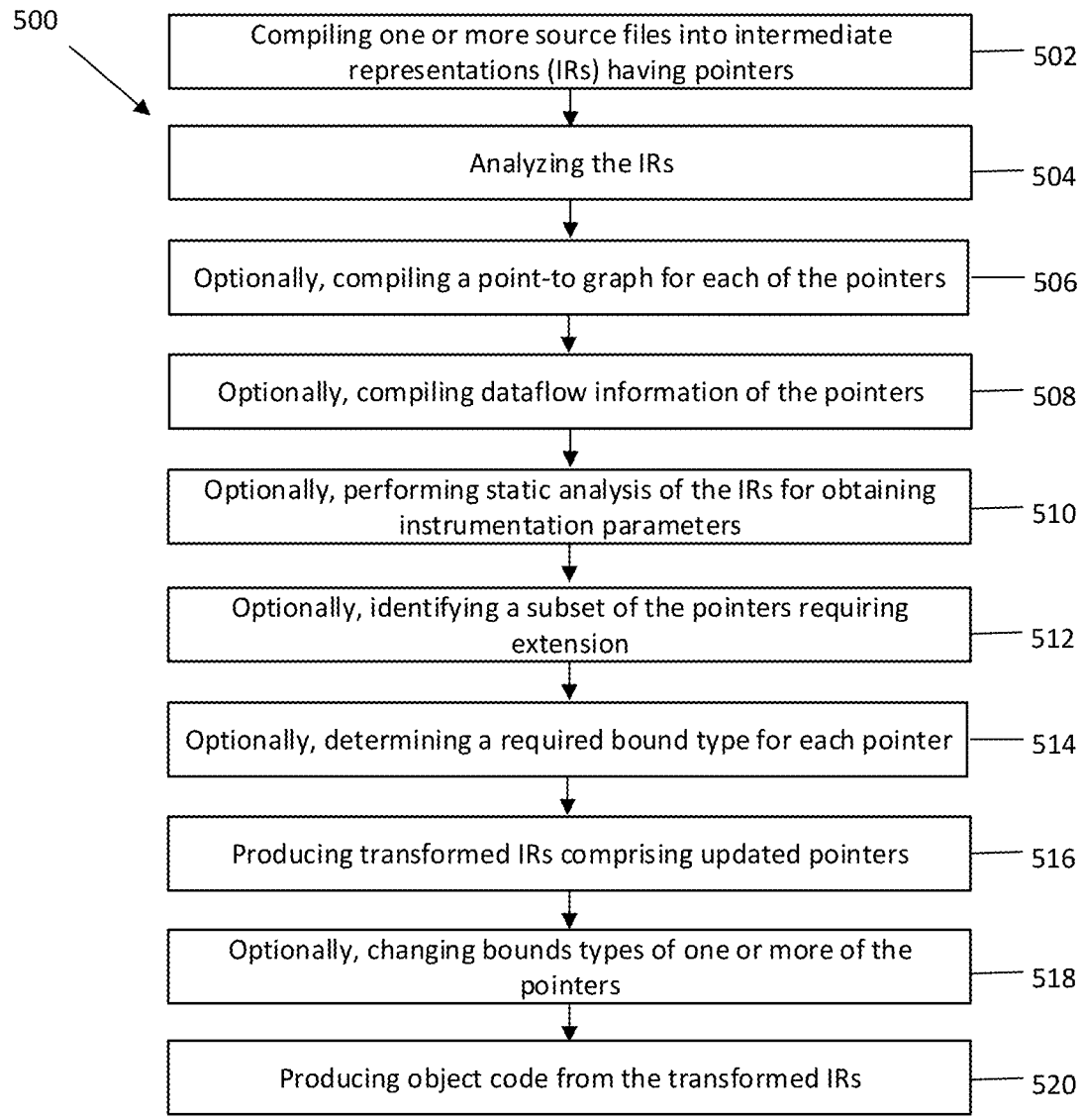
FIG. 5 is a block diagram of a method for updating pointers in intermediate representations in accordance with representative embodiments of the present disclosure.

FIG. 5 is a flowchart showing the steps of a method 500, according to some embodiments of the present disclosure. The method 500 begins with compiling one or more source files into IRs having pointers (step 502). At step 504, IRs are analyzed. Optionally, at step 506, a point-to graph is compiled for each of the pointers. Optionally, at step 508, dataflow information is compiled for the pointers. Optionally, at step 510, a subset of the pointers that are joint pointers for merging are identified. Optionally, at step 512, static analysis of the IRs is performed for obtaining instrumentation parameters. Optionally, at step 514, a subset of the pointers requiring extension are identified. Optionally, at step 516, a required bound type for each pointer is identified. At step 518, transformed IRs are produced comprising updated pointers. Optionally, at step 520, bounds types of one or more of the pointers is changed. At step 522, object code is produced from the transformed IRs.

As used herein, a "device" is a term of explanation referring to a hardware structure such as a circuitry implemented using technologies such as electrical and/or optical technologies (and with more specific examples of semiconductors) for performing defined operations or processings. A "device" may alternatively refer to the combination of a hardware structure and a software structure, wherein the hardware structure may be implemented using technologies such as electrical and/or optical technologies (and with more specific examples of semiconductors) in a general manner for performing defined operations or processings according to the software structure in the form of a set of instructions stored in one or more non-transitory, computer-readable storage devices or media.

As used herein, the device may be a part of an apparatus, a system, and/or the like, wherein the device may be coupled to or integrated with other parts of the apparatus, or system such that the combination thereof forms the apparatus, or system.

The device executes a process for performing. Herein, a process has a general meaning equivalent to that of a method, and does not necessarily correspond to the concept of computing process (which is the instance of a computer program being executed). More specifically, a process herein is a defined method implemented using hardware components for process data. A process may comprise or use one or more functions for processing data as designed. Herein, a function is a defined sub-process or sub-method for computing, calculating, or otherwise processing input data in a defined manner and generating or otherwise producing output data.

As those skilled in the art will appreciate, the method disclosed herein may be implemented as one or more software and/or firmware programs having necessary computer-executable code or instructions and stored in one or more non-transitory computer-readable storage devices or media which may be any volatile and/or non-volatile, non-removable or removable storage devices such as RAM, ROM, EEPROM, solid-state memory devices, hard disks, CDs, DVDs, flash memory devices, and/or the like. The device may read the computer-executable code from the storage devices and execute the computer-executable code to perform the methods disclosed herein.

Alternatively, the methods disclosed herein may be implemented as one or more hardware structures having necessary electrical and/or optical components, circuits, logic gates, integrated circuit (IC) chips, and/or the like.

The devices may be computing devices that may be portable and/or non-portable computing devices such as laptop computers, tablets, smartphones, Personal Digital Assistants (PDAs), desktop computers, smart devices, and/or the like. Each computing device may execute one or more client application programs which sometimes may be called "apps".

Figure 6:
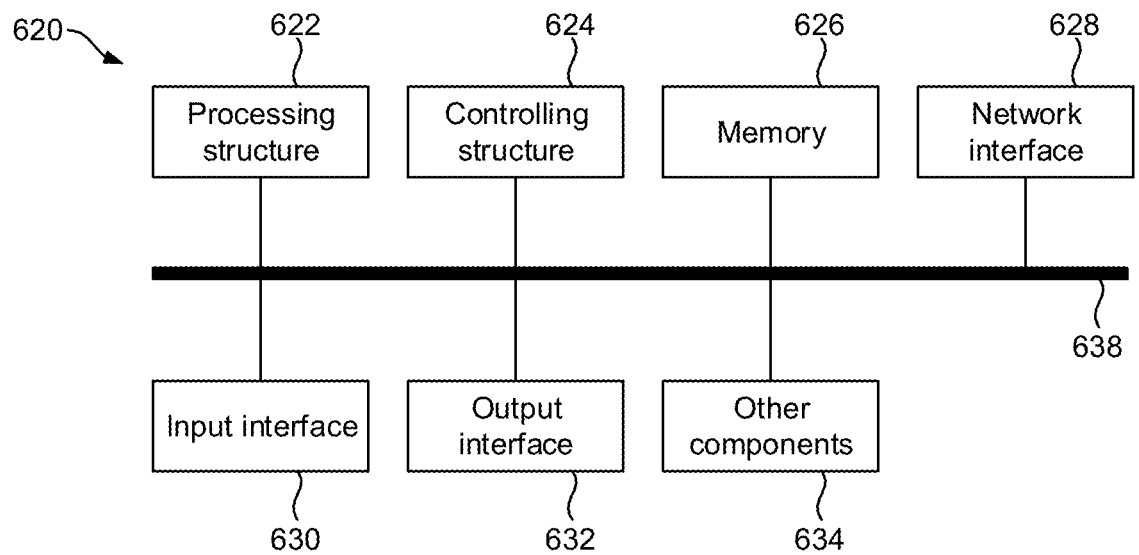
FIG. 6 is a schematic diagram showing a simplified hardware structure of a computing device.

Generally, the computing devices comprise similar hardware structures such as hardware structure 620 shown in FIG. 6. As shown, the hardware structure 620 comprises a processing structure 622, a controlling structure 624, one or more non-transitory computer-readable memory or storage devices 626, a network interface 628, an input interface 630, and an output interface 632, functionally interconnected by a system bus 638. The hardware structure 620 may also comprise other components 634 coupled to the system bus 638.

The processing structure 622 may be one or more single-core or multiple-core computing processors, generally referred to as central processing units (CPUs), such as INTEL® microprocessors (INTEL is a registered trademark of Intel Corp., Santa Clara, CA, USA), AMD® microprocessors (AMD is a registered trademark of Advanced Micro Devices Inc., Sunnyvale, CA, USA), ARM® microprocessors (ARM is a registered trademark of Arm Ltd., Cambridge, UK) manufactured by a variety of manufactures such as Qualcomm of San Diego, California, USA, under the ARM® architecture, or the like. When the processing structure 622 comprises a plurality of processors, the processors thereof may collaborate via a specialized circuit such as a specialized bus or via the system bus 638.

The processing structure 622 may also comprise one or more real-time processors, programmable logic controllers (PLCs), microcontroller units (MCUs), u-controllers (UCs), specialized/customized processors, hardware accelerators, and/or controlling circuits (also denoted "controllers") using, for example, field-programmable gate array (FPGA) or application-specific integrated circuit (ASIC) technologies, and/or the like. In some embodiments, the processing structure includes a CPU (otherwise referred to as a host processor) and a specialized hardware accelerator which includes circuitry configured to perform computations of neural networks such as tensor multiplication, matrix multiplication, and the like. The host processor may offload some computations to the hardware accelerator to perform computation operations of neural network. Examples of a hardware accelerator include a graphics processing unit (GPU), Neural Processing Unit (NPU), and Tensor Process Unit (TPU). In some embodiments, the host processors and the hardware accelerators (such as the GPUs, NPUs, and/or TPUs) may be generally considered processors.

Generally, the processing structure 622 comprises necessary circuitry implemented using technologies such as electrical and/or optical hardware components for executing transformer related processes.

For example, the processing structure 622 may comprise logic gates implemented by semiconductors to perform various computations, calculations, and/or processings. Examples of logic gates include AND gate, OR gate, XOR (exclusive OR) gate, and NOT gate, each of which takes one or more inputs and generates or otherwise produces an output therefrom based on the logic implemented therein. For example, a NOT gate receives an input (for example, a high voltage, a state with electrical current, a state with an emitted light, or the like), inverts the input (for example, forming a low voltage, a state with no electrical current, a state with no light, or the like), and output the inverted input as the output.

While the inputs and outputs of the logic gates are generally physical signals and the logics or processings thereof are tangible operations with physical results (for example, outputs of physical signals), the inputs and outputs thereof are generally described using numerals (for example, numerals "0" and "1") and the operations thereof are generally described as "computing" (which is how the "computer" or "computing device" is named) or "calculation", or more generally, "processing", for generating or producing the outputs from the inputs thereof.

Sophisticated combinations of logic gates in the form of a circuitry of logic gates, such as the processing structure 622, may be formed using a plurality of AND, OR, XOR, and/or NOT gates. Such combinations of logic gates may be implemented using individual semiconductors, or more often be implemented as integrated circuits (ICs).

A circuitry of logic gates may be "hard-wired" circuitry which, once designed, may only perform the designed functions. In this example, the processes and functions thereof are "hard-coded" in the circuitry.

With the advance of technologies, it is often that a circuitry of logic gates such as the processing structure 622 may be alternatively designed in a general manner so that it may perform various processes and functions according to a set of "programmed" instructions implemented as firmware and/or software and stored in one or more non-transitory computer-readable storage devices or media. In this example, the circuitry of logic gates such as the processing structure 622 is usually of no use without meaningful firmware and/or software.

Of course, those skilled in the art will appreciate that a process or a function (and thus the processor) may be implemented using other technologies such as analog technologies.

Referring back to FIG. 6, the controlling structure 624 comprises one or more controlling circuits, such as graphic controllers, input/output chipsets and the like, for coordinating operations of various hardware components and modules of the computing device.

The memory 626 comprises one or more storage devices or media accessible by the processing structure 622 and the controlling structure 624 for reading and/or storing instructions for the processing structure 622 to execute, and for reading and/or storing data, including input data and data generated by the processing structure 622 and the controlling structure 624. The memory 626 may be volatile and/or non-volatile, non-removable or removable memory such as RAM, ROM, EEPROM, solid-state memory, hard disks, CD, DVD, flash memory, or the like.

The input interface 630 comprises one or more input modules for one or more users to input data via, for example, touch-sensitive screen, touch-sensitive whiteboard, touch-pad, keyboards, computer mouse, trackball, microphone, scanners, cameras, and/or the like. The input interface 630 may be a physically integrated part of the computing device (for example, the touch-pad of a laptop computer or the touch-sensitive screen of a tablet), or may be a device physically separate from, but functionally coupled to, other components of the computing device (for example, a computer mouse). The input interface 630, in some implementation, may be integrated with a display output to form a touch-sensitive screen or touch-sensitive whiteboard.

The output interface 632 comprises one or more output modules for output data to a user. Examples of the output modules comprise displays (such as monitors, LCD displays, LED displays, projectors, and the like), speakers, printers, virtual reality (VR) headsets, augmented reality (AR) goggles, and/or the like. The output interface 632 may be a physically integrated part of the computing device (for example, the display of a laptop computer or tablet), or may be a device physically separate from but functionally coupled to other components of the computing device (for example, the monitor of a desktop computer).

The system bus 638 interconnects various components 622 to 634 enabling them to transmit and receive data and control signals to and from each other.

Figure 7:
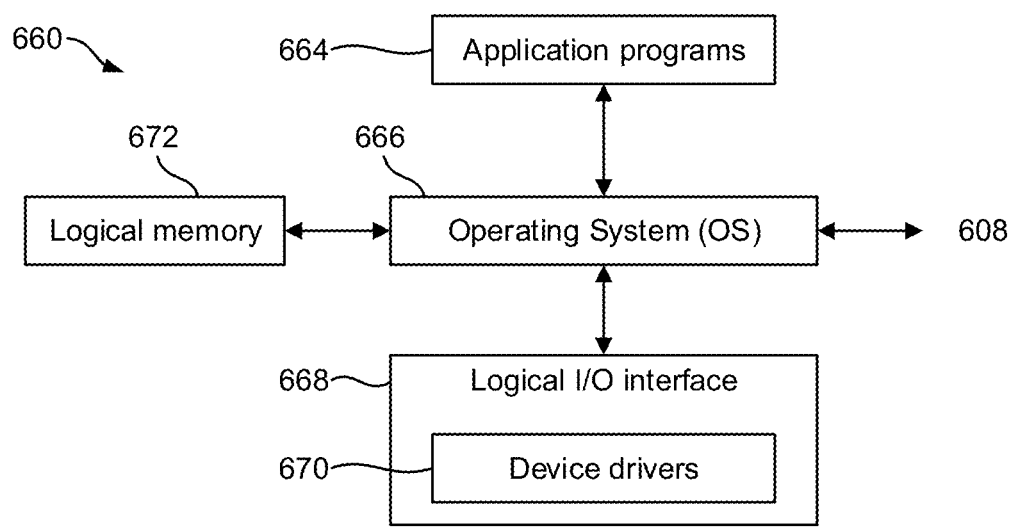
FIG. 7 is a schematic diagram showing a simplified software architecture of a computing device.

FIG. 7 shows a simplified software architecture 660 of the computing device. The software architecture 660 comprises one or more application programs 664, an operating system 666, a logical input/output (I/O) interface 668, and a logical memory 672. The one or more application programs 664, operating system 666, and logical I/O interface 668 are generally implemented as computer-executable instructions or code in the form of software programs or firmware programs stored in the logical memory 672 which may be executed by the processing structure 622.

The one or more application programs 664 executed by or run by the processing structure 622 for performing various tasks such as the methods disclosed herein.

The operating system 666 manages various hardware components of the computing device 602 or 604 via the logical I/O interface 668, manages the logical memory 672, and manages and supports the application programs 664. The operating system 666 is also in communication with other computing devices (not shown) via the network 608 to allow application programs 664 to communicate with those running on other computing devices. As those skilled in the art will appreciate, the operating system 666 may be any suitable operating system such as MICROSOFT® WINDOWS® (MICROSOFT and WINDOWS are registered trademarks of the Microsoft Corp., Redmond, WA, USA), APPLE® OS X, APPLE® IOS (APPLE is a registered trademark of Apple Inc., Cupertino, CA, USA), Linux, ANDROID® (ANDROID is a registered trademark of Google LLC, Mountain View, CA, USA), or the like. The computing devices may all have the same operating system, or may have different operating systems.

The logical I/O interface 668 comprises one or more device drivers 670 for communicating with respective input and output interfaces 630 and 632 for receiving data therefrom and sending data thereto. Received data may be sent to the one or more application programs 664 for being processed by one or more application programs 664. Data generated by the application programs 664 may be sent to the logical I/O interface 668 for outputting to various output devices (via the output interface 632).

The logical memory 672 is a logical mapping of the physical memory 626 for facilitating the application programs 664 to access. In this embodiment, the logical memory 672 comprises a storage memory area that may be mapped to a non-volatile physical memory such as hard disks, solid-state disks, flash drives, and the like, generally for long-term data storage therein. The logical memory 672 also comprises a working memory area that is generally mapped to high-speed, and in some implementations volatile, physical memory such as RAM, generally for application programs 664 to temporarily store data during program execution. For example, an application program 664 may load data from the storage memory area into the working memory area, and may store data generated during its execution into the working memory area. The application program 664 may also store some data into the storage memory area as required or in response to a user's command.

Embodiments have been described above in conjunctions with aspects of the present invention upon which they may be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

Although the present invention has been described with reference to specific features and embodiments thereof, it is evident that various modifications and combinations may be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

The invention claimed is:

1. A method comprising:
compiling one or more source files into intermediate representations (IRs) having pointers;
analyzing the IRs;
producing transformed IRs comprising updated pointers;
producing object code from the transformed IRs;
determining a subset of the pointers that result in arithmetic and spatial memory errors; and
determining bounds types and changes for pointer types of the subset of the pointers for avoiding the arithmetic and spatial memory errors.

2. The method of claim 1, wherein the pointers have uncompressed bounds.

3. The method of claim 1 further comprising: for each of the pointers, compiling a point-to graph with features of layout transformation.

4. The method of claim 3, wherein the point-to graph comprises allocation nodes, object-partition nodes, and pointer-expression nodes.

5. The method of claim 3, wherein said compiling the point-to graph comprises: compiling dataflow information of the pointers.

6. The method of claim 1, wherein said analyzing the IRs comprises: analyzing the IRs of all of the one or more source files, or performing static analysis of the IRs for obtaining instrumentation parameters.

7. The method of claim 6, wherein said analyzing the IRs comprises said performing the static analysis of the IRs for obtaining the instrumentation parameters; and wherein the static analysis comprises: identifying a subset of the pointers requiring extension and determining a required bound type for each pointer.

8. The method of claim 1, wherein said producing the transformed IRs comprises: changing bounds types of one or more of the pointers.

9. The method of claim 1, wherein the method is configured for execution by one or more processors compatible with Capability Hardware Enhanced Reduced-Instruction-Set-Computer(RISC) Instructions (CHERI) pointer architecture.

10. One or more processors configured with instructions to perform the method of claim 1.

11. One or more non-transitory computer-readable storage devices comprising computer-executable instructions, wherein the instructions, when executed, cause a one or more processors to perform actions comprising:
compiling one or more source files into intermediate representations (IRs) having pointers;
analyzing the IRs;
producing transformed IRs comprising updated pointers;
producing object code from the transformed IRs;
determining a subset of the pointers that result in arithmetic and spatial memory errors; and
determining bounds types and changes for pointer types of the subset of the pointers for avoiding the arithmetic and spatial memory errors.

12. The one or more non-transitory computer-readable storage devices of claim 11, wherein the pointers have uncompressed bounds.

13. The one or more non-transitory computer-readable storage devices of claim 11, wherein analyzing the IRs comprises:
  analyzing the IRs of all of the one or more source files; or
  performing static analysis of the IRs for obtaining instrumentation parameters.

14. The one or more non-transitory computer-readable storage devices of claim 13, wherein the static analysis comprises: identifying a subset of the pointers requiring extension.

15. The one or more non-transitory computer-readable storage devices of claim 14, wherein identifying the subset of the pointers requiring extension comprises: determining a required bound type for each pointer.

16. The one or more non-transitory computer-readable storage devices of claim 11, wherein the instructions, when executed, cause the one or more processors to perform further action of compiling a point-to graph for each of the pointers.

17. The one or more non-transitory computer-readable storage devices of claim 16, wherein the point-to graph comprises allocation nodes, object-partition nodes, and pointer-expression nodes.

18. The one or more non-transitory computer-readable storage devices of claim 11, wherein said producing the transformed IRs comprises: changing bound types of one or more of the pointers.

* * * * *